April 15, 1969  W. M. BENSE  3,438,135
UNIVERSAL JOINT GAUGE
Filed Feb. 14, 1964
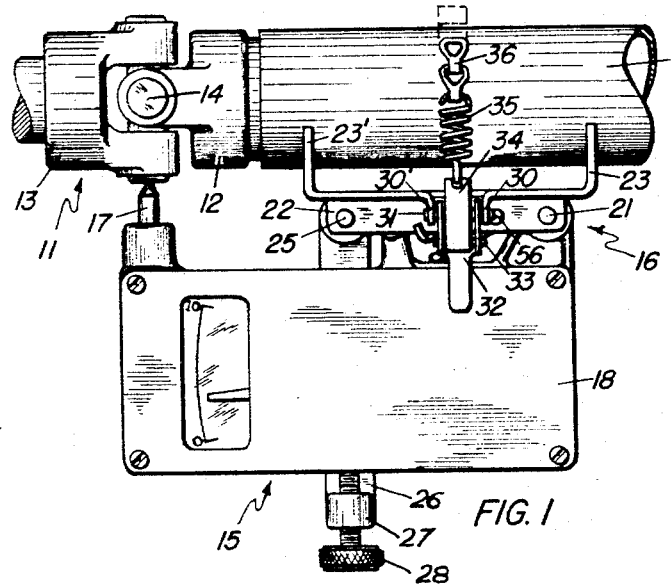
FIG. 1
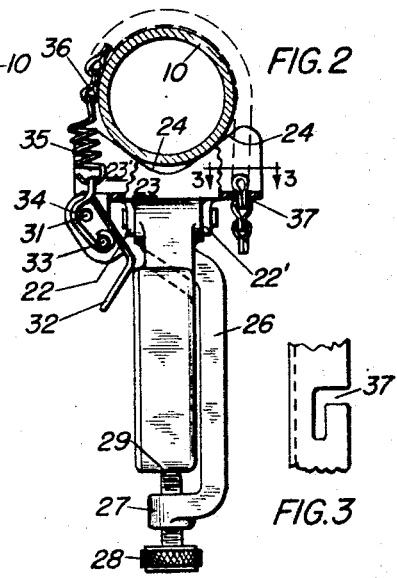
FIG. 2
FIG. 3
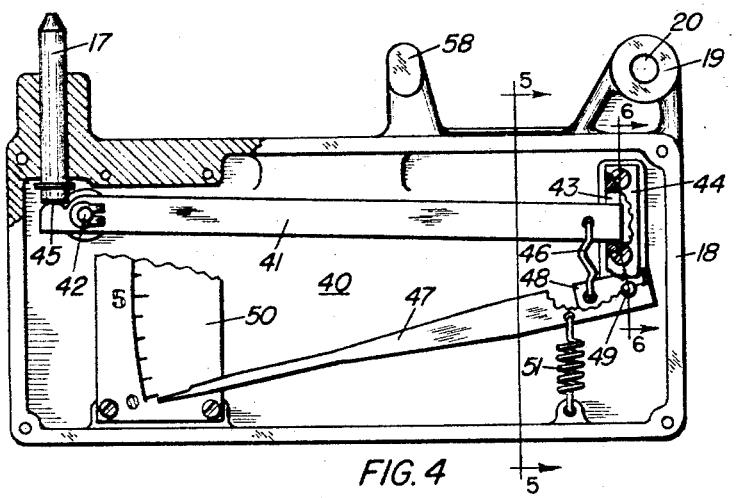
FIG. 4
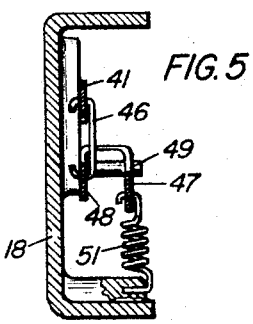
FIG. 5
FIG. 6
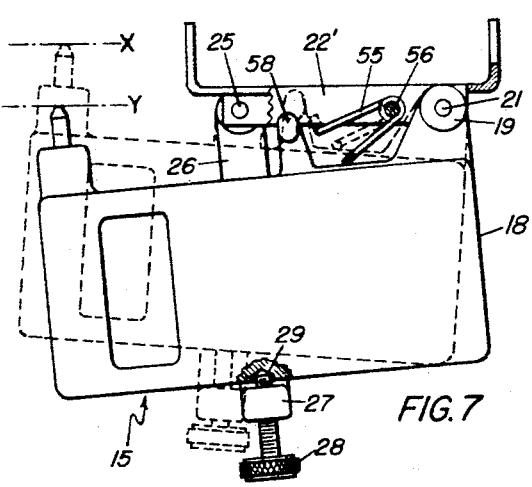
FIG. 7
William M. Bense
INVENTOR.
BY Barlow & Barlow

United States Patent Office 3,438,135
Patented Apr. 15, 1969

3,438,135
UNIVERSAL JOINT GAUGE
William M. Bense, Barrington, R.I., assignor, by mesne assignments, to Precision Universal Joint Corporation, Chicago, Ill., a corporation of Illinois
Filed Feb. 14, 1964, Ser. No. 345,049
Int. Cl. G01b 5/25, 3/22
U.S. Cl. 33—172                                5 Claims This invention relates to a universal joint gauge and is particularly adaptable for measuring the wear that occurs in the trunnions and bearings of a typical universal joint.

It has been quite customary in the past to estimate the amount of wear that has occurred in a universal joint. This has been done by grasping the drive shaft with one hand and grasping the tail shaft with the other hand and rocking the same to feel the amount of wear. It is obvious that one's judgment as to the amount of wear that has occurred can vary, and it is therefore desirable to have some type of mechanical indicating means which will tell the average mechanic the amount of wear that has indeed taken place. A certain amount of wear can be tolerated in an universal joint that is used in the drive shaft of an automotive vehicle, but beyond a tolerable limit, excessive wear causes vibration and non-uniform loading of the drive shaft due to the sloppy linkage between two parts thereof.

It is therefore the principal object of this invention to provide a simple gauge which may be readily affixed to the drive shaft and have a measuring pointer positioned to engage a portion of the universal joint.

A further object of the invention is to provide a gauge which is simple in operation and which does not employ delicate parts and therefore is adaptable to rough teatment.

Another object of the invention is to provide a simple mounting means for a gauge of the general type which may be easily and yet positively locked to a drive shaft and adjusted into operating position.

With these and other objects in view, the invention consists of certian novel features of construction as will be more fully described and particularly pointed out in the appended claims.

In the accompanying drawings:

FIG. 1 is an elevational view showing the gauge of the invention in operating position;

FIG. 2 is an end view thereof taken from the right hand side of FIG. 1;

FIG. 3 is a view taken on line 3—3 of FIG. 2 looking in the direction of the arrows at a locking means for the clamping device;

FIG. 4 is an elevational view of the gauge portion of the device with the cover removed and with certain parts broken away to show the operation of the indicating mechanism;

FIG. 5 is a sectional view taken on lines 5—5 of FIG. 4;

FIG. 6 is a sectional view taken on lines 6—6 of FIG. 4; and

FIG. 7 is a diagrammatic view on a reduced scale showing the limits of adjustment of the gauge in its special mounting bracket.

In proceeding with this invention, I provide an indicating device with a contact point and couple this to an indicator that is graduated in a suitable manner such as thousandths of an inch or in bands labeled good, fair, bad. I mount this device on a clamp which is adapted to be strapped to the drive shaft of an automotive vehicle, the mounting between the indicator and the clamp facilitating pivotal movement therebetween and adjustment of the contact point relative to the work to be measured. In the indicating linkage I further provide a simple connector between two parts thereof so that initial calibration may be had and further, positive stops are provided for the indicating linkage to prevent any shock loads that might be applied to the contact point being transmitted to the indicator pointer with consequent damage of the mechanism.

Referring now to the drawings and particularly FIG. 1 there is illustrated a drive shaft 10 having at one end thereof a universal joint generally indicated 11. The universal joint, as is customary, is made up of two parts namely a part 12 which is coupled to the drive shaft 10 and a part 13 which is coupled to the next section of the drive shaft. The two parts 12 and 13 are interconnected by crossed trunnions 14 which form a general X shape and which are received in respective ears of the parts 12 and 13, thus forming a usual construction well known to those versed in the art. The gauge 15 which is the subject of this invention is provided with a mounting bracket means generally indicated at 16 to clamp the same to the drive shaft 10. Broadly, in this fashion, the gauge is adapted through its contact point rod 17 to determine the play relative to the drive shaft 10 of the trunnions 14.

To achieve this result, the gauge 15 is provided with a casing 18 which at one end thereof has an ear 19 with a bore 20. Received in the bore 20, is a pivot pin 21 that passes between two flanges 22, 22' of the mounting bracket 16. The flanges 22, 22' are an integral part of the mounting bracket which is provided with a pair of seating portions 23, 23' both of which portions have V shaped edges as at 24 (see FIG. 2) to permit seating thereof on the drive shaft 10. Also pivotally related to the flanges 22, 22' on the post 25, is an adjustment bracket 26 which is offset to the back of the case 18 of the indicator and has an interned end 27 in which is received a screw 28 the end of which abuts the casing 18 as at 29. A pair of ears 30, 30' are struck from the bracket 16 and passing between these flaps is a pin 31 on which a bifurcated lever 32 is pivotally received. A pin 33 passes between the forks of the bifurcated lever 32, one end of the strap connector 34 being received on the pin 33, the other end being connected to a spring 35 which in turn is connected to a chain or other flexible means 36, which may be fastened in a slot 37. With the chain 36 passed up over the drive shaft and locked in the slot 37, it is evident that a tightening device is formed by the lever 32 and the strap 34 such that in effect a toggle action is obtained.

As will be evident from the drawings the casing 18 is generally rectangular and is provided with a dished out central portion 40 in which the indicating mechanism is located. This mechanism comprises a main lever arm 41 which is received on a pivot 42 and guided for movement in its free end in a slot 43 formed by a block 44 that is clamped to the wall of the casing 18. The end of the lever 41 adjacent the pivot 42 contacts the inner end of the contact point rod 17 as at 45, and the other end of the lever 41 is provided with a link coupling 46 to an indicator arm 47 by a reversally bent extension 48 thereof, the reversally bent portion being received on a pivot 49. The provison of the reversally bent portion stabilizes the pointer 47 to permit it to travel over a scale 50 which is marked with suitable indicia thereon, for example, thousandths of an inch. Tensioning of the indicator linkage is had by a tension spring 51 which is connected to the indicator pointer 47, and initial adjustment to a small degree below the zero on the indicator is had by bending the link 46 to the proper dimension. It will be appreciated that the arm 41 rides in the slot 43 which effectively provides a pair of stops as at 52 and 53. The stop 52 is the zero stop, and thus when the arm 41 is against this stop, the pointer 47 should be just below the datum or the zero point as shown in the drawing. This may be readily achieved by bending the link 46 which is of stiff stock that will retain its adjusted position. Further, it will be apparent that with the arm 41 riding in the slot 43, that damage to the mechanism is prevented by over travel of the contact point rod 17 as any shock or impact that is imparted to the rod 17 will merely rock the lever 41 against the stop 53 and will prevent the pointer 47 from over travel and consequent damage.

To place the gauge in operation, it is merely necessary to attach it to a drive shaft and slide it along the drive shaft until the contact point 17 is adjacent one of the trunnions of the universal joint on the part of the universal joint not directly attached to the drive shaft. In the illustrated example it should be understood that part 13 is immediately adjacent the transmission of a vehicle. Accordingly, the drive shaft is in its extreme downward position, as viewed in the drawing through action of gravity. Thus, to achieve a zero reading on the indicator, the thumb screw 28 is rotated until the arm 47 indicates datum or zero. The drive shaft 10 is then pushed upwardly, as viewed in the drawing, and a new reading is obtained, which is the amount of wear that has occurred in the trunnions 14 of the universal joint. Each universal joint has certain tolerance limits within which it can practically operate, and if this tolerance limit has been exceeded, then the joint is unduly worn and should be replaced by a new unit.

The zero adjustment that has been briefly eluded to above, is easily rendered over a wide range. Referring to FIG. 7, it will be seen that the casing 18 is normally pressed against the adjustment screw 28 by a spring means 55 which is received around a pin 56, the ends of the spring bearing respectively on the flanges 22, 22' and the wall of the casing 18 (see FIGS. 1 and 7). With the screw 28 fully backed out, as shown in full lines in FIG. 7, the contact point may be placed at the position Y and with the screw fully turned in, the relative position of the contact point may be advanced to the broken line position or position X. During this movement, not only does the casing 18 pivot about its pivot point 21 but also the adjustment bracket 26 pivots on its pivot point 25. To insure that the casing does not rock relative to its pivot 21, a plug 58 or projection is provided from the casing 18 which has edges that snugly fit between the flanges 22, 22' and thus provide a snug fitting device which will not unduly rock on its pivot 21 or cause wear therein through use.

I claim:
1. In a universal joint tester, a housing, detector means movable in the housing, a contact point at one end of the detector means and projecting from said housing, a gauge needle pivoted in said housing, a gauge dial against which said needle may be read, mechanism within said housing operably connecting said detector means to said gauge needle, means for adjustably securing said housing in fixed position relative to a drive shaft with said contact point in contact with a universal joint trunnion at one end of said drive shaft comprising, first and second V-seats, connector means between said V-seats for releasably securing said V-seats in contact with said drive shaft, which connector means include an elongated flexible member having a free end for encircling said drive shaft, said connector means including means for releasable engagement with said free end, adjustable bracket means mounting said housing from said V-seats with said contact point in said spaced relation with the V-seats and with one of the V-seats being disposed between the other V-seat and said contact point, said bracket means including manual adjustment means and cooperating spring means for moving said housing relative to said V-seats thereby to position said contact point in contact with said trunnion, the spring means acting to hold the housing in the postions established by manipulation of said adjustment means thereby to permit rapid adjustment of the position of said contact point.

2. The universal joint tester according to claim 1 further defined by, said connector means including a bracket rigid with said V-seats, said housing being pivotally connected to said bracket thereby to permit swinging movement of the contact point, said adjustment means including a member pivotally supported by said bracket for movement relative to the latter and to said housing, said spring means being interposed between said bracket and said housing.

3. The universal joint tester according to claim 1 wherein said connector means includes a resilient strap.

4. The universal joint tester according to claim 3 wherein said connector means includes a toggle lever to tighten and release said strap.

5. In a universal joint tester, a housing, detector means movable in one end of said housing, a contact point at one end of said detector means and projecting from said housing, means for securing said housing in fixed position relative to a drive shaft with said contact point in contact with a universal joint trunnion at one end of such drive shaft comprising a V-seat at the end of said housing opposite said contact point, a second V-seat intermediate the ends of said housing and means between said V-seats to hold said V-seats in contact with such drive shaft, a gauge needle pivoted in said housing, a gauge dial against which said needle may be read, and a lever system within said housing operatively connecting said detector means to said gauge needle.

References Cited
UNITED STATES PATENTS

| 357,818 | 2/1887 | Clark | 24—270 |
| 715,582 | 12/1902 | Jacobs | 33—172 |
| 1,162,289 | 11/1915 | Hanson | 33—172 |
| 1,206,668 | 11/1916 | Caron | 33—172 |
| 1,674,417 | 6/1928 | Thayer | 33—193 |
| 2,627,118 | 2/1953 | Young | 33—172 |
| 2,726,058 | 12/1955 | Faltz | 33—172 |
| 3,097,410 | 7/1963 | Lincoln | 24—270 |

WILLIAM D. MARTIN, Jr., *Primary Examiner.*

U.S. Cl. X.R.

33—148, 180, 193

Disclaimer and Dedication 3,438,135.—*William M. Bense*, Barrington, R.I. UNIVERSAL JOINT GAUGE. Patent dated Apr. 15, 1969. Disclaimer and dedication filed Aug. 7, 1972, by the assignee, *Precision Universal Joint Corporation*.

Hereby disclaims and dedicates to the Public the terminal part of the term of said patent.

[*Official Gazette January 16, 1973.*]